T. H. BATLA.
FISH GRAPPLE.
APPLICATION FILED APR. 17, 1915.
1,148,740.
Patented Aug. 3, 1915.
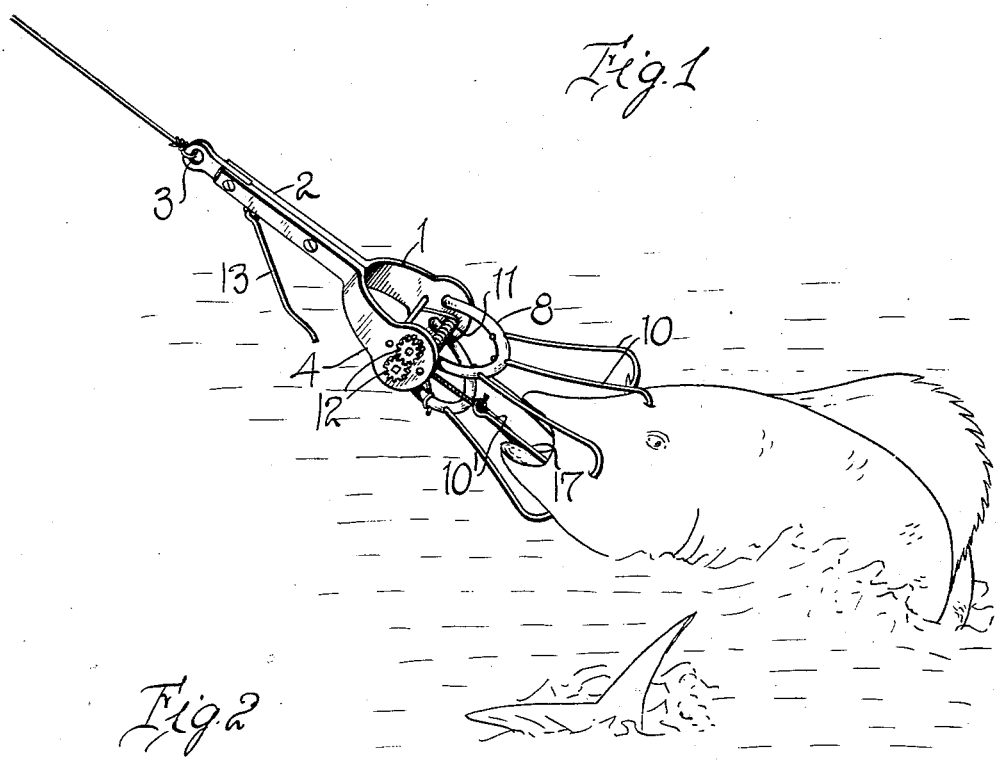
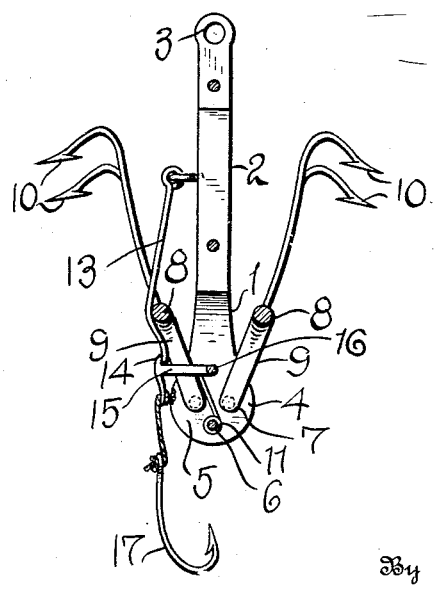
Inventor
T. H. BATLA
By Watson E. Coleman
Attorney

UNITED STATES PATENT OFFICE.

THOMAS H. BATLA, OF TEMPLE, TEXAS.

FISH-GRAPPLE.

1,148,740.

Specification of Letters Patent. Patented Aug. 3, 1915.

Application filed April 17, 1915. Serial No. 22,159.

*To all whom it may concern:*

Be it known that I, THOMAS H. BATLA, a citizen of the United States, residing at Temple, in the county of Bell and State of Texas, have invented certain new and useful Improvements in Fish-Grapples, of which the following is a specification, reference being had to the accompanying drawings.

This invention relates to fishing and trapping and particularly to a fishing device of the grapple type, the parts of which are so arranged that when a baited hook is nibbled by the fish, the spring pressed jaws will be released and instantly closed, said jaws embodying prongs or hooks which will engage the fish and prevent its escape.

The invention has for its primary object an efficient construction of a device of this character, the parts of which are so arranged that they may be easily manufactured and assembled and not liable to get out of order, and which will operate positively and quickly upon the springing of the trap. And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawing, in which—

Figure 1 is a perspective view of a fishing trap embodying the improvements of my invention. Fig. 2 is a view of the device with the parts in set position.

Corresponding and like parts are referred to in the following description and designated in all of the views of the accompanying drawing by like reference characters.

Referring to the drawing, the numeral 1 designates the main frame of my improved trap, said frame being in the form of a yoke and embodying a shank 2, provided at one end with an eye 3 for an attachment to a line and having diverging arms 4 at the other end of the shank, said arms being formed with enlarged bearing extremities 5. A spring encircled shaft 6 is journaled in the extremities of the arms 4, and also journaled in the extremities of the arms 4 on opposite sides of said shaft are the trunnions 7 of jaws 8, each of said jaws embodying in the present instance a U-shaped member 9 from which any desired number of hooks or prongs 10 project, the bills of the hooks extending inwardly toward each other, as clearly illustrated in the drawing. The spring 11 which encircles the shaft 6 is secured to one of the arms 4 at one end and at its other end is coiled any desired number of times around one of the U-shaped members 9 and in order to provide for the simultaneous operation of both jaws, the trunnions 7 at one end are extended through the adjoining arm 4 and are provided on their extended ends with meshing pinions 12. Thus it will be understood that when one of the jaws is moved the other will be correspondingly moved. In order to hold the jaws in their open or set position, I provide a latch 13 which is pivotally connected at one end to the shank 2 and which is curved, as shown, so that its other end is adapted to extend around one of the U-shaped members 9 to hold the jaws open, the extremity of said latch being then engaged with the shoulder 14 to a trigger 15 which is formed in the nature of a crank arm on a transversely extending rod 16 journaled in the arms 4 and extending across the same above the shaft 6. The trigger 15 is formed with an opening designed to receive a snood or the like, upon which a hook 17 is adapted to be suspended, whereby when the hook is nibbled or pulled upon, it will release the trigger from the latch and free the latter, whereupon the jaws will at once be released and instantly and forcibly closed upon the fish.

From the foregoing description in connection with the accompanying drawing, the operation of my improved trap will be apparent.

In the practical use of the device, the hook 17 is baited, and the jaws are then against the tension of the spring 11, so that the latch 13 is engaged first around the U-shaped members 9 and then with the shoulder 14 of the trigger 15. Thus the trap will be held set with the jaws in open position and just as soon as the hook 17 is disturbed, the trigger will be released from the latch 13 and the jaws will be permitted to close.

While the accompanying drawing illustrates what I believe to be the preferred embodiment of my invention, it is to be understood that the invention is not limited thereto, but that various changes may be made in the construction, arrangements and proportions of the parts without departing from the scope of the invention as defined in the appended claims.

What is claimed, is:

1. A fish grapple including a supporting yoke, a pair of substantially U-shaped jaws having terminal trunnions journaled in the yoke, hooks carried by each jaw, means operatively connecting the jaws, whereby one jaw controls the position and movement of the other, a yieldable member engaging one of the jaws for normally holding both of the jaws in closed position, a latch engageable with one of the jaws for holding both the jaws in open position, a trigger controlling the latch, and a bait holder connected to the trigger.

2. A fish grapple including a supporting yoke, a pair of substantially U-shaped jaws having terminal trunnions, said trunnions being journaled in the yoke, intermeshing pinions keyed on the adjacent trunnions of the jaws, whereby the movement of one jaw is communicated to the other jaw, hooks carried by the jaw, a shaft extending between the arms of the yoke, a spring wound helically on the shaft and having its one terminal engaged with one of the jaws, and its other terminal fixed relative to the yoke, said spring serving to normally hold both of the jaws in closed position, a latch member engageable with one of the jaws for holding both of said jaws in open position, a trigger controlling the latch, and a bait holder for the latch.

In testimony whereof I hereunto affix my signature in the presence of witnesses.

THOMAS H. BATLA.

Witnesses:
J. B. TALLEY,
LETHA EASTERWOOD,
C. B. WADE.

Copies of this patent may be obtained for five cents each, by addressing the "Commissioner of Patents. Washington, D. C."